United States Patent Office 3,304,744
Patented Feb. 21, 1967

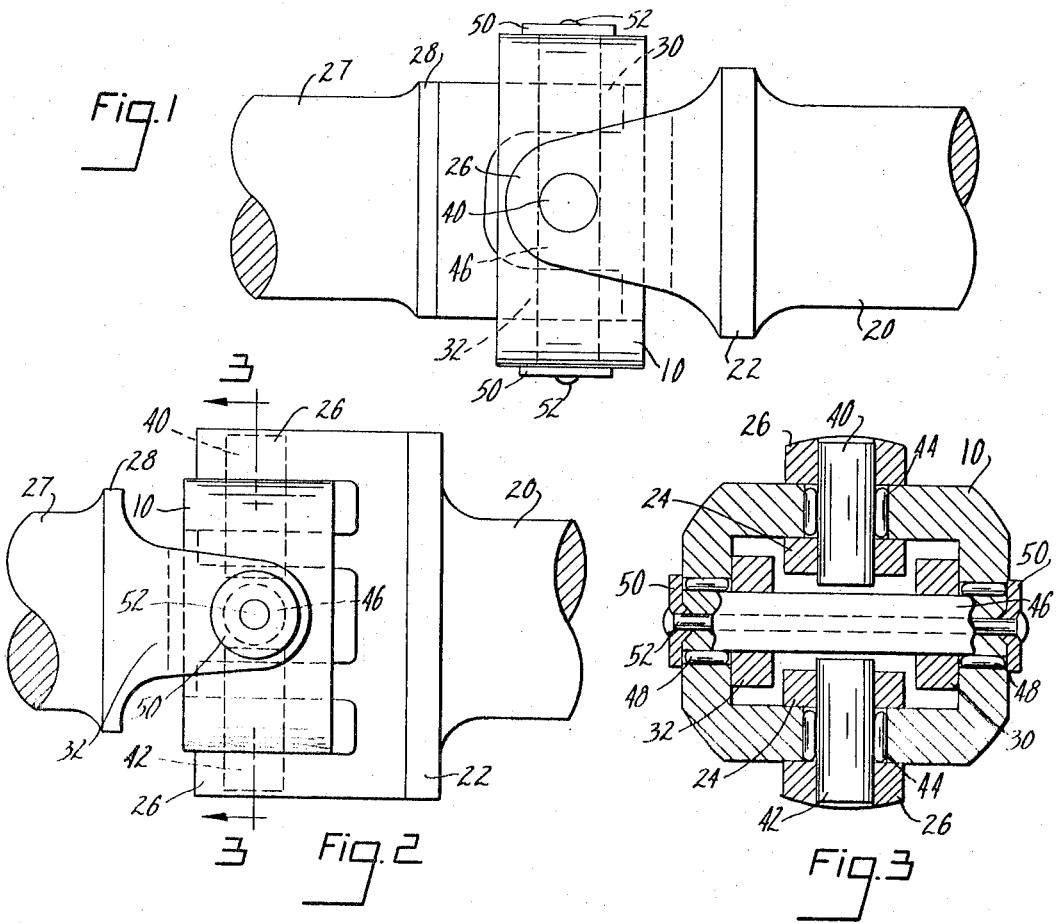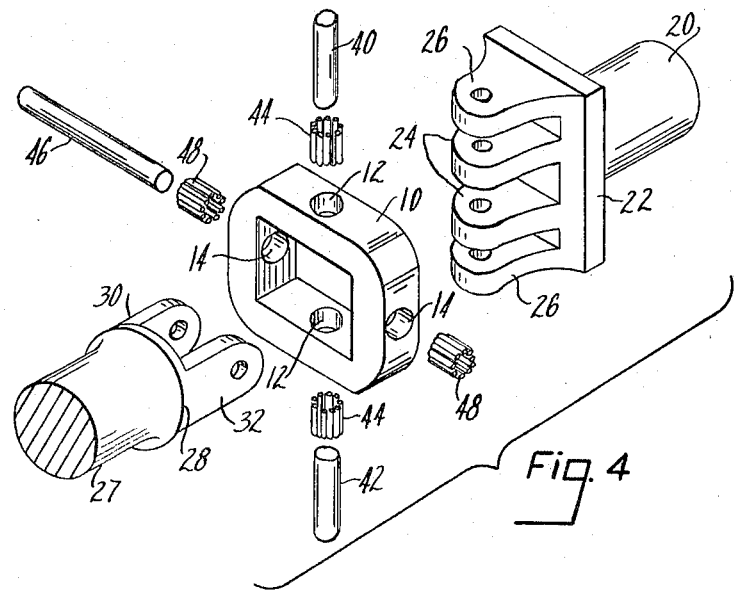

3,304,744
NEEDLE BEARING MOUNTED UNIVERSAL JOINT
Cranston W. Folley, Kennebunk, Maine, assignor to Maremont Corporation, Chicago, Ill., a corporation of Illinois
Filed Nov. 2, 1964, Ser. No. 408,235
1 Claim. (Cl. 64—18)

The present invention relates to an improved needle bearing mounted universal joint, and more particularly to a universal joint of this description adapted for use in the steering train of a tilt steering wheel.

It is a principal object of the invention to provide a simplified and improved construction of a needle bearing mounted universal joint in which the needles are directly supported against the walls of the bearing apertures for engagement with the associated pivot pins of the bearings and in which the elements of the universal joint are so constructed and arranged as to lock the needles in position.

It is a further object of the invention to provide a construction and arrangement of a needle bearing mounted universal joint of the general type described which is readily assembled to form a tightly set up, long wearing bearing having a minimum number of parts.

With these and other objects in view as may hereinafter appear, the several features of the invention will be readily understood by one skilled in the art from the following description taken in connection with the accompanying drawings, in which:

FIG. 1 is a top plan view of a universal joint connecting the driving and driven elements;

FIG. 2 is a view in side elevation of the needle bearing mounted universal joint of FIG. 1;

FIG. 3 is a sectional view taken on a line 3—3 of FIG. 2; and

FIG. 4 is an exploded view of the bearing including driving and driven elements, square band-shaped needle bearing supporting spider, groups of needles associated with each bearing and the associated pivot pins.

The invention is herein disclosed as embodied in a universal joint adapted for connecting two shafts forming a portion of the steering train from the steering wheel of a power driven vehicle. The universal joint is constructed and arranged to operate with a minimum of friction loss, with substantially no play between the parts, and without appreciable wear.

Referring specifically to the drawing, the universal joint comprises a load carrying spider 10, which takes the form roughly of a rectangular band having two pairs of internal needle bearing apertures 12, 12 and 14, 14 formed in opposite sides thereof along two intersecting axes. Spider 10 is connected with an operating shaft 20 at one side of the universal joint by means of a double arm yoke 22 having inner and outer arms 24, 26 formed with bearing apertures aligned with and abutting the inner and outer ends of the needle bearing apertures 12, 12 provided on one of said intersecting axes. Spider 10 is connected with an operating shaft 27 at the other side of the universal joint by means of a yoke 28 having a pair of arms 30, 32 formed with bearing apertures aligned with and abutting the inner ends of the needle bearing apertures 14, 14 formed in the other pair of opposed sides of said spider 10. The yoke 22 is pivotally connected to the spider 10 by means of two short pins 40, 42 each of which is press-fitted through the bearing apertures formed in the respective inner and outer arms 24, 26 and passes with suitable clearance through the needle bearing provided by needles 44 in the needle bearing apertures 12, 12 formed in the spider 10. The yoke arms 24, 26 form end closures for the needles in the needle bearing apertures 12, 12. The yoke 28 having the arms 30 and 32 is pivotally connected with the perpendicularly arranged pair of needle bearings by means of a long bearing pin 46 which is press-fitted through apertures formed in the arms 30, 32 and at its two ends passes through the needle bearings provided by needles 48 in the needle bearing apertures 14, 14 formed in the spider 10. The needles 48 for said bearings are held in position by covers 50 secured to the two ends of the pin 46 by a rivet 52 extending axially the length of the pin.

The needle bearing mounted universal joint above described has the advantage that it is constructed with a minimum number of parts to provide a tight compact joint suitable for use in a steering wheel drive train in which compactness and lack of play in the bearing are of the greatest importance. In particular the arrangement of the spider 10 and the yokes 22 and 28 is such that the bearing apertures formed in these elements may be employed in combination with bearing pins to confine the needles 44 of the several bearings firmly in position without the usual supporting races. The pivot pins 40, 42 and 46 are press fitted into the respective bearing apertures of the yoke arms thereby eliminating any possibility of looseness or play in the bearing other than that produced by the necessary working clearance allowed for in the needle bearings.

The invention having been described what is claimed is:

A needle bearing mounted universal joint having, in combination, a band-shaped spider having rectangularly placed sides and opposed bearing apertures formed in opposite sides along perpendicularly intersecting axes, needle bearings comprising a series of needles lining each said spider bearing aperture, a yoke having two pairs of inner and outer arms embracing two opposite sides of said spider and having apertures in alignment with the needle-lined bearing apertures in said sides along one said axis, a second yoke having a pair of arms supported inwardly of opposed sides of said spider and having apertures aligned with the needle-lined bearing apertures in said sides along the other said axis, separate short bearing pins press fitted into the apertures in each pair of inner and outer arms of said double yoke, and passing through the aligned needle-lined bearing apertures of said spider, thereby forming a closure for said needles between said inner and outer arms enclosing the two ends of said bearing apertures, a long bearing pin press fitted through the apertures in the arms of the second said yoke and at each end extending outwardly through the aligned needle-lined bearing apertures of said spider, and covers secured to the ends of said long bearing pin thereby providing closures for the needles between said covers and the arms fitted against the inner ends of said needle-lined bearing apertures.

References Cited by the Examiner

UNITED STATES PATENTS

| | | | |
|---|---|---|---|
| 1,064,623 | 6/1913 | Duerrstein | 64—17 |
| 1,186,134 | 6/1916 | Ross | 64—17 |
| 1,307,961 | 6/1919 | Dahlmon | 74—18 X |
| 1,993,192 | 3/1935 | Swenson | 64—18 |
| 2,067,283 | 1/1937 | Padgett | 29—438 |
| 2,141,935 | 12/1938 | Rose | 64—18 X |
| 2,213,448 | 9/1940 | Morton | 29—438 |
| 2,844,949 | 7/1958 | Stillwagon | 64—17 |
| 2,871,965 | 2/1959 | Ainsworth | 64—18 X |
| 2,920,709 | 1/1960 | Holmes et al. | 64—18 X |
| 2,947,157 | 8/1960 | Harris | 64—18 |

FRED C. MATTERN, JR., *Primary Examiner.*

HALL C. COE, *Examiner.*